Aug. 28, 1956

G. S. HURST 2,761,071

FAST NEUTRON DOSIMETER

Filed May 13, 1954

INVENTOR.
George S. Hurst
BY
Roland A. Anderson
ATTORNEY

Aug. 28, 1956

G. S. HURST 2,761,071

FAST NEUTRON DOSIMETER

Filed May 13, 1954

INVENTOR.
George S. Hurst
BY
Roland A. Anderson
ATTORNEY

INVENTOR.
George S. Hurst

United States Patent Office 2,761,071
Patented Aug. 28, 1956

2,761,071

FAST NEUTRON DOSIMETER

George S. Hurst, Oak Ridge, Tenn., assignor to the United States of America as represented by the United States Atomic Energy Commission Application May 13, 1954, Serial No. 429,713

7 Claims. (Cl. 250—83.1)

The present invention relates to radiation measurement, and more especially to an improved method and apparatus for determining the radiation dosage, or amount of energy that will be absorbed by living cells irradiated by fast neutrons.

The amount of damage done to a living cell by incident neutrons depends in part upon the total amount of energy absorbed by the cell and the distribution of the ionization produced therein. Accordingly, the amount of energy absorbed per gram of animal tissue is taken as a measure of radiation "dosage." The unit of dosage measurement, called the "rep" (Roentgen-equivalent-physical), is defined as that amount of radiation which is absorbed in tissue to the extent of 95 ergs per gram of tissue.

Alpha and beta particles may ionize atoms of tissue directly, while gamma rays produce secondary electrons which ionize the tissue. Fast neutrons collide elastically with hydrogen, nitrogen, carbon, and oxygen atoms; the maximum amount of energy being transferred to the lighter hydrogen nuclei, or recoil protons. These particles lose their energy in the tissue by excitation and ionization. Considering the effect only of the first collision of a neutron, it has been determined that the dose received per neutron per cm.$^2$ of tissue varies with the neutron energy E as the quantity: $E\Sigma_i \delta_i f_i Q_i$, where $\delta_i$=the scattering cross section of the ith kind of atom; $f_i$= the average fractional loss of energy per collision with the ith ind of atom; $Q_i$=the quantity per unit volume of the ith kind of atoms; and the summation is taken for hydrogen, oxygen, carbon, and nitrogen. When neutron and gamma rays are both present, the energy per gram of tissue transferred by each type of radiation should be separately measured, since both the biological effect and shielding considerations are different for each type of radiation.

Prior fast neutron dosage measurements have been made in a number of ways. Special ionization chambers have been provided with solid hydrogenous walls to provide a tissue-equivalent response. These walls required special insertion of nitrogen and carbon atoms in the normal plastic material during manufacture, and were responsive to all types of radiation—alpha, beta, gamma, and neutrons. With these counters, it was impossible to distinguish the dose due to each individual type of radiation, so a second ion chamber, sensitive only to gamma radiation, was customarily provided, and gamma-produced current was subtracted from the neutron-plus-gamma produced current to obtain a reading due solely to neutrons. My improved fast neutron dosimeter, U. S. Patent 2,616,052, partially overcame the problem of distinguishing between neutron and gamma dose, and comprised a proportional counter filled with an hydrogen-bearing gas, and having at one end a plain hydrogenous slab of pre-determined composition and thickness and covered by a metal foil, the composition and thickness of the wall and foil, the length of the counter, and the composition and pressure of the gas being critically related such that the counting response indicated by a count rate meter would give a measure of the fast neutron dose to tissue.

While eminently suited for neutron measurements in normal use, it is evident that my patented counter is directional in response since its design considerations were based on the calculated response of a plain slab of hydrogenous material to a collimated beam of fast neutrons parallel to the counter axis and normal to the slab. In field measurement, however, all neutrons do not generally come from a single known direction, so that it would be highly desirable to be able to measure accurately the neutron dosage under such conditions, if possible. Accordingly, I have improved my patented counter to eliminate its directional response limitations in a manner described fully hereinafter.

I have as a primary object of my invention provision of a novel method of and apparatus for measuring the fast neutron dosage, or energy absorbed in tissue from fast neutrons which is not subject to directional response limitations. Another object of my invention is to provide a novel method of and apparatus for measuring the fast neutron dosage to tissue in the presence of gamma radiation. A further object of my invention is to provide an improved neutron dosimeter which is substantially free from directional effects, so that collimation of the neutron beam is not necessary for accurate dose measurement.

Other objects and advantages of my invention will become apparent from the following detailed description of a preferred embodiment thereof, when read with reference to the appended drawings, in which:

Figure 5 illustrates the ratio of electron collection time to amplifier time constant.

Figure 1:
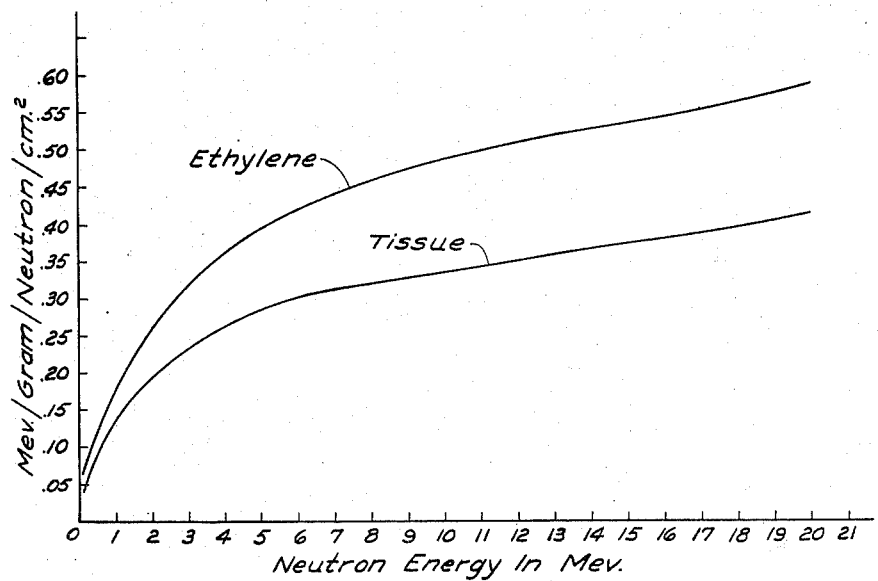
Figure 1 illustrates a comparison of the dose curves of ethylene and average wet tissue.

I have found that under special conditions, I can derive a signal from a neutron counter which is proportional to the neutron dose to tissue. A first of these conditions is that the counter itself be tissue equivalent; as described in connection with Figure 1, I have found that a polyethylene lined, ethylene gas filled counter fulfills this condition. Secondly, the counter must be operated in the proportional region so that the pulse amplitudes are proportional to the energy loss by the ionizing recoil protons.

Thirdly, the dimensions of the counter must be small compared to the range of high energy secondary electrons created by gamma interaction with the counter material so that the neutron-induced pulses may be counted above the gamma-pulse level. I have found that I can distinguish between the dose due to gamma rays and that due to fast neutrons if the longest dimension of my counter is kept within certain limits. Normally counters are built as large as may be practically used in the application for which they are designed, in order to obtain more counting volume and therefore form counting sensitivity. However, with large counters the ionization tracks caused by secondary electrons produced by the gamma rays may be so large as to be indistinguishable from the neutron-induced proton recoil tracks. But if I restrict the longest dimension of my neutron counter to less than the range in ethylene of an electron of substantially ½ the energy of the lowest energy neutrons to be counted, I can clearly distinguish between the pulses produced by the gamma rays and those produced by the neutrons. Since the lower limit of the fast neutron range may be taken as 200 k. e. v. (kilo-electron-volts), the longest possible gamma path within the chamber must produce a collected pulse smaller than 200 k. e. v., say 150–180 k. e. v., so that the pulses may be distinguished by amplitude discrimination. From the tables of electron ranges in gases, it is seen that the maximum range of a 200 k. e. v. electron is 36 centimeters in air. However, I have observed that due to the many collisions suffered by the electron as it crosses the chamber, its path is not a straight line, but rather a series of random displacements to one side and the other of a line representing its path, so that the electron actually travels approximately twice as far as the direct path length would indicate. I have noted further that electron pulses tend to pile up at the amplifier input when they occur substantially in coincidence, so that two or more pulses may be superimposed upon one another to get an unduly large pulse. The net effect of these two factors combined to produce pulses of substantially 200 k. e. v. from, not 200 k. e. v. electrons, but rather from 100 k. e. v. electrons. Therefore, in order to successfully measure 200 k. e. v. fast neutrons, I have found that I must make the maximum gas path, with ethylene at one atmosphere pressure, no greater than the range of a 100 k. e. v. electron, and preferably of the order of a 75–90 k. e. v. electron, that is, 6.4–9.5 cm.

Fourthly, the counter liner should be of greater thickness than the maximum range of the recoil protons produced by the neutrons, so that all of the proton energy will be given up inside the counter. Since generally neutrons up to 15 m. e. v. are to be measured, producing up to 15 m. e. v. protons, and these protons have a range of substantially 225 mg./cm.$^2$ in the ethylene, poly ethylene liner (density 1.26) must be at least .170 centimeter in thickness. The liner must, of course be coated with a thin conductor such as "acquadag" (colloidal graphite), aluminum, gold, or the like, in order to provide the necessary potential difference between the center wire and the counter wall.

Fifthly, the output pulse amplitude of the counter must be amplified to a useful level, yet the output pulse amplitude of the amplifier must somehow be made proportional to the number of ion pairs causing the counter pulse, regardless of the orientation or position of the ionizing tracks. When these conditions are satisfied, an addition of pulse heights will then measure the dose due ot fast neutrons. Normally the pulse height in a proportional counter depends upon the point within the counter where a single ion pair is first formed because the gas amplification may vary along the length of the center wire and because an electron from the ion pair may become attached to form a heavy ion and never be collected. To overcome these difficulties, I have provided field tubes along the ends of the center wire to maintain the gas amplification constant along the wire, and I utilize a filling gas as free as practicable from oxygen and water vapor, in order to avoid electron attachment.

Moreover, the pulse height at the linear amplifier output may depend upon the angle that the ionizing track makes with the center wire, since the rise time of the pulse increases with the collection time of the outermost electron. I have found that where the amplifier is of the pure R. C.-type with equal differentiating and integrating time constants $t_1$, the output does not change appreciably for a ratio of electron collection time $T_0/t_1$ as great as unity. In practice, therefore, the height of the amplifier output pulse will be proportional to the number of electrons, independent of track orientation, when the collection time of the outermost electrons in the chamber is not substantially greater than the amplifier time constant. Ratios of $T_0/t_1$ of the order of 1.6 give satisfactory results in practice, although a smaller ratio is to be desired.

Since the amplitude of the pulse in a proportional counter, depends upon the gas amplification, that factor must be known before accurate neutron dosage can be obtained. Since the ends of the field tubes define the sensitive volume of the counter, and since the energy of an alpha-particle source may be determined accurately, the counter may preferably be provided with a calibration source, and calibrated in terms or energy absorbed from alpha source. Where no calibration source, is used, the counter may be calibrated by means of a primary, calibrated counter.

According to the principles of my invention, therefore, I provide a proportional counter filled with ethylene gas and lined with a layer of polyethylene of thickness greater than the range of the most energetic recoil protons so that the energy dissipated by the recoils in the gas represents the original energy dissipated by the neutrons in the gas. To measure the energy dissipated per gram of ethylene, I measure the total ionization produced in the chamber, not by a direct ion-current measurement, but by pulse amplification with a linear amplifier of certain particular characteristics and by adding pulse amplitudes above a pre-determined bias level. I have found that the pulse height is proportional to the number of ion pairs created in the gas, provided the electrons remain free in crossing the counter to the wire and provided the amplifier time constant is substantially equal to or longer than the collection time of electrons. In a preferred embodiment, I provide also means for finding the exact counter volume and means for calibrating the counter before each use.

Referring now to Figure 1, the upper curve is a graph of energy absorbed per gram of ethylene per neutron per cm.$^2$ plotted against neutron energy in m. e. v. The lower curve is a similar plot of dose to average wet tissue (having a composition by weight of 10% H, 4% N, 73.6% O, and 12% C). I have found, as the two curves show, that the two media have essentially the same energy dependence, so that ethylene may be said to be "tissue equivalent" for fast neutrons. Therefore I use ethylene filling gas and a counter lined with polyethylene to determine the number of ion pairs produced per gram of gas filling the cavity. The ethylene gas should be substantially pure to prevent electron attachment with molecules of contaminating gases such as oxygen and water vapor, for reasons stated above. These impurities may be eliminated by hot calcium purification as described by J. Allen and B. Rossi in Manhattan District Declassified Document MDDC–448, available from AEC Depository Libraries or the Office of Technical Services, Department of Commerce, Washington, D. C. Medical grade ethylene is generally of sufficient purity to be flowed directly through the counter, when a gas-flow type counter may be used, without further purification.

Figure 2:
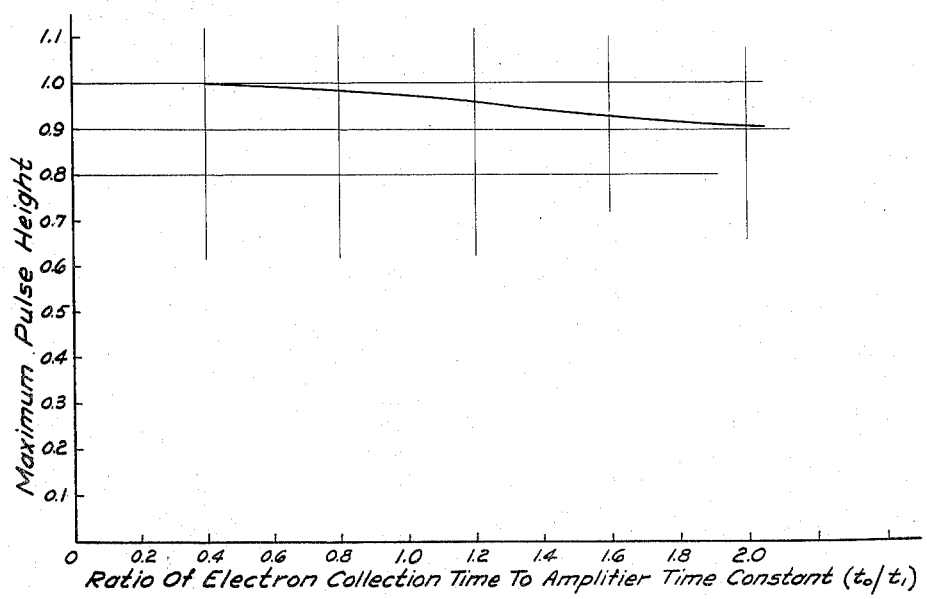
Figure 2 illustrates a preferred embodiment of my novel counter.
Figure 2:
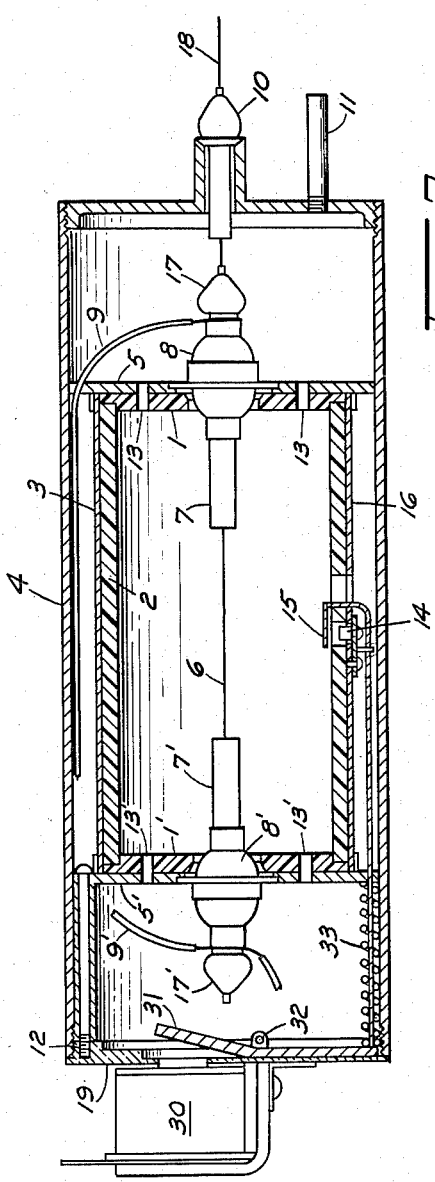

Referring now to Figure 2, in a preferred counter configuration the sensitive region or volume is surrounded by tubular polyethylene liner 2, carried on the inner walls of brass cylinder 3, which is disposed concentrically within brass tube 4 and supported at either end by base plates 5, 5'. These plates carry polyethylene slabs 1, 1' on their inner surfaces, the slabs closing opposite ends of liner 2. Three bolts may be provided in threaded apertures 12, one of which is shown, to fasten end plate 5' to end plate 19. The center wire 6 is held in place along the central axis of the counter by glass-to-metal Kovar seals 17, 17' mounted on field tubes 7, 7'. The field tubes are metal sleeves mounted inside Kovar seals 8, 8' and extending through the base plates 5, 5' into the counting chamber concentrically about the wire 6. An electrical potential may be maintained by means of leads 9, 18 between the tubes and the wire so as to provide a definite active volume in the counter between opposing tube ends. The wire may be coupled through Kovar seal 10 and lead 18 to an external amplifier and voltage source described hereinafter. When a flow type counter is desired, gas inlet nipple 11 may be provided in one end wall of tube 4, an exit nipple may be provided in a threaded aperture not shown, extending through end plate 19, 12, and small axial apertures 13, 13', may be provided in the end plates 5, 5' and in the end walls 1, 1' to allow gas to flow through the sensitive counter volume. Where a sealed counter is desired, the exit nipple and inlet 11 may be crimped and sealed off after the counter has been flushed and filled with purified ethylene gas.

An alpha particle source 14, preferably $Pu^{239}$, is provided with shutter 15 and mounted in the wall 16, the shutter when closed blocking entrance of alpha particles into the counter 1 and when open allowing entrance of the particles into the same region. The shutter is preferably of a magnetic material so as to be movable with an external magnet. Relay 30 may be provided on the counter to move the shutter through arm 31, moving about pivot 32. Spring 33 will return the shutter to position when the relay current ceases.

Figure 3:
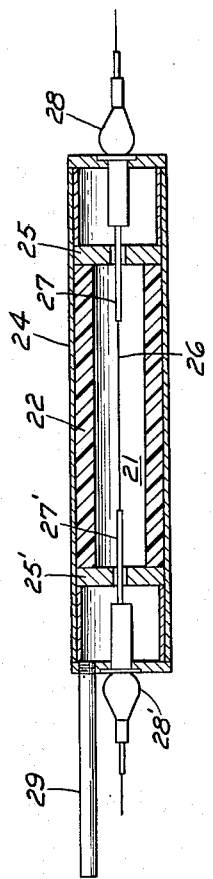
Figure 3 illustrates an alternative configuration of a counter designed according to the principles of my invention.

Referring now to Figure 3, a smaller, alternative counter design having no calibration source is illustrated. This small counter comprises simply a counter volume 21 filled with ethylene gas, a polyethylene liner 22 carried on the inner surface of brass tube 24, and polyethylene end plates 25, 25' abutting against the ends of liner 22 to form a closed cylinder. Center wire 26 is disposed along the axis of the counter, and may be supported by metal capillary tubing 27, 27' which pierces end walls 25, 25' and is joined to Kovar seals 28, 28'. The counter may be filled through filling tube 29 which is then crimped to prevent gas escape. A potential may be maintained across the counter between the center wire 26 and the outer tube 24 by a potential source not shown. The dimensions of the maximum gas path for electrons are much smaller than the critical range, while the thickness of the polyethylene liner is greater than the minimum thickness for proton stopping.

Figure 4:
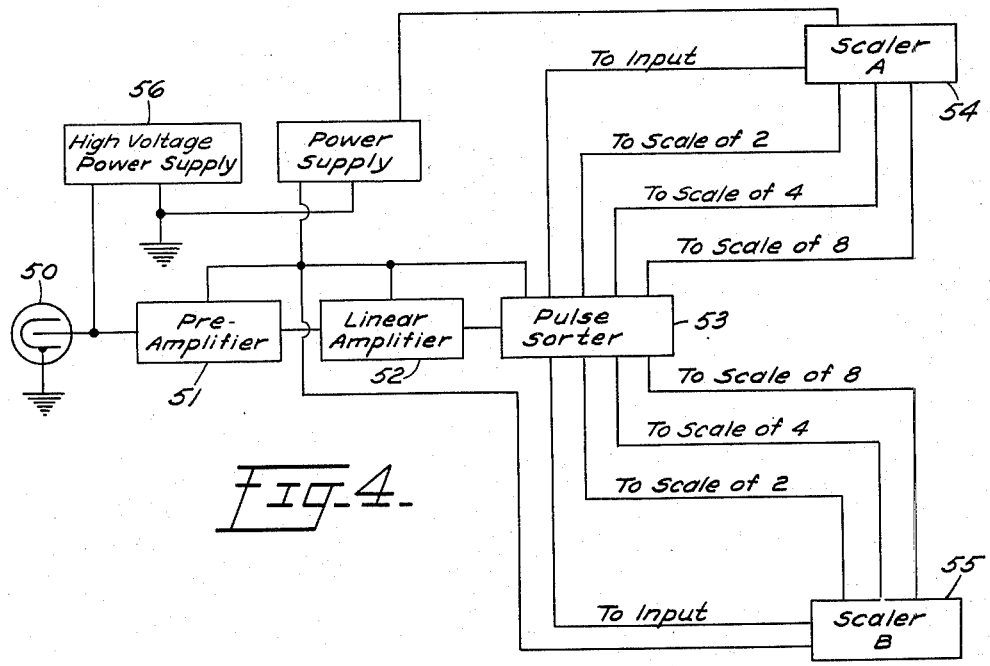
Figure 4 illustrates a block diagram of the circuit arrangement developed for use with my novel counter for automatically adding pulse heights.

In Figure 4 a block diagram of the pulse integrater used with my dosimeter is shown. The center wire of counter 50 is connected to pre-amplifier 51 to a linear amplifier 52, the output of which is coupled to pulse sorter 53. The sorter routes pulses of different amplitudes along different paths to scalers 54, 55. The pre-amplifier and amplifier may be of the type known as the A1 Amplifier, described in Review of Scientific Instruments, vol. 18, page 10 (1947). The pulse sorter may consist of a low impedance driver section and seven discriminator channels so arranged that all discriminators with bias settings less than the pulse amplitude will pass the pulse along its output path to a connected scaler stage. A suitable sorter circuit is illustrated in Review of Scientific Instruments, vol. 23, page 69 (1952). The scalers may be any commercially available binary scaler instrument having its scaling stages altered to provide additional inputs at binary 2 stage, binary 4 stage, and binary 8 stage for connection to the pulse sorter. A suitable circuit for coupling into the stages of the Higginbotham type scaler is shown in Review of Scientific Instruments, vol. 23, page 70 (1952). A regulated high voltage supply 56 is coupled across the counter 50 to operate the same in the proportional region.

If, for example, the first four discriminator stages are biased so that pulse heights of 5, 10, 20, and 40 volts, respectively, are required to make the stages deliver an output pulse, and the discriminators feed into the 1, 2, 4, and 8 count stages of a binary scaler, then each time the first stage conducts because of the arrival of a 5 volt pulse, one count is added to the scaling unit. When a 10 volt pulse arrives, both stages 1 and 2 conduct, adding 3 counts or one count, depending on the setting of the first scaling stage. Thus the average will be two counts for a 10 volt pulse. In like fashion, a 20 volt pulse gives an average of four counts, and a 40 volt pulse gives an average of eight counts. Since discriminators of lower bias level merely add and subtract counts from the system, which are cancelled out on the average, it is not necessary to use anti-coincidence circuits. Where two scalers are used, as in Figure 4, the consecutive discriminator voltages may lay differ by small amounts. The first and second discriminator stages may preferably be set to the same bias, while for the remainder of the channels a gradually increasing bias is employed. Then a pulse within the first bias interval will give two counts, one within the second bias interval will give three counts and pulses within the remaining intervals give four, six, eight, twelve, and sixteen counts respectively. Acceptable voltage levels for each discriminator channel are given in R. S. I. 23, 69–72, supra. With the subject system neutron dose may be obtained by adding the number of counts registered on both scalers and comparing the number with a calibration curve made with neutron sources of known intensity.

In order to be able to discriminate against gamma radiation, counter 50 must be operated in the proportional regions. The dimensions of the counter must be small compared to the range of high energy secondary electrons from gamma rays so that the recoil pulses may be counted above the electron pulse level.

In typical operation, the counter of Figure 3 may have a two mil center wire and be filled to atmospheric pressure with ethylene. With 3400 volts potential maintained across the counter, the electron collection time is 2.5 microseconds. With the A–1 linear amplifier (.5 megacycle position), the time constant is 1.5 microseconds, and the ratio $T_0/t_1$ is 1.6. Referring now to the curve of Figure 5, where the maximum pulse height is plotted against the ratio $T_0/t_1$, it may be seen that for a ratio of 1.6 the spread in pulse height due to different track orientations will be less than 6%. Since the average proton track has a collection time much less than the maximum of 2.5 microseconds, this condition is considered satisfactory for field use.

Figure 6:
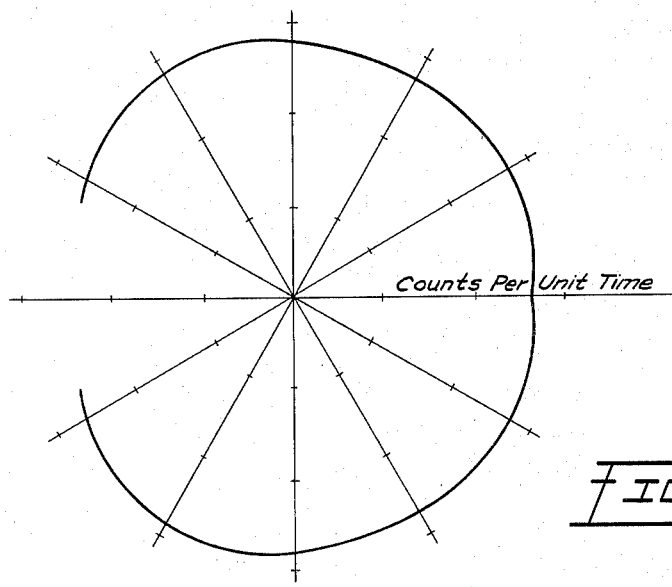
Figure 6 is a graph showing the directional response of my improved dosimeter.

The non-directional character of my improved counters are shown in Figure 6, plotted on polar coordinate paper, the counts per unit time being plotted against the angle between counter and neutron source. A curve drawn to the plotted points shows substantially equal numbers of counts, irrespective of the relative position of the counter and source.

Thus it will be apparent to those skilled in the art that I have provided for the first time a counter for fast neutrons which is non-directional in response and which enables accurate measurement of neutron dose to tissue in the presence of a gamma field.

Having described my invention, I claim:

1. A fast neutron dosimeter system comprising a counter provided with an outer cylindrical shell, a collector electrode disposed axially within said shell, a pair of field tubes disposed about opposite ends of said electrode and electrically connected to said shell, an inner cylindrical shell coaxial with said outer shell and electrically connected thereto, polyethylene walls carried by the inner surfaces of said inner shell, ethylene gas disposed within said walls, means for establishing a potential between said outer shell and collector electrode to operate said counter in the proportional region, a linear amplifier coupled to said electrode for amplifying pulses produced at said electrode by incidence of fast neutrons, and means for integrating those pulses larger than a selected amplitude, the integrated pulse amplitude being proportional to the fast neutron dose to tissue.

2. A fast neutron dosimeter system comprising a counter provided with an outer shell, a polyethylene cylinder disposed within said shell, ethylene gas disposed within said cylinder, a collector wire electrode disposed axially within said cylinder, means for establishing a potential between said shell and said electrode to operate said counter in the proportional region, a linear amplifier coupled to said counter for amplifying pulses produced therein by incidence of fast neutrons, and means for integrating those pulses from said amplifier larger than a selected amplitude, the integrated pulse amplitude being proportional to the fast neutron dose to tissue.

3. A fast neutron dosimeter system comprising a counter provided with an outer shell, a collector electrode disposed axially within said shell, a polyethylene cylinder disposed concentrically around said electrode and electrically connected to said shell, means for flowing substantially pure ethylene gas through said counter, means for establishing a potential between said shell and said electrode to operate said counter in the proportional region, a linear amplifier coupled to said electrode for amplifying pulses produced at said electrode by incidence of fast neutrons, and means for integrating those pulses larger than a selected amplitude.

4. A fast neutron dosimeter system having a uniform, non-directional response comprising a counter provided with an outer cylindrical shell, a collector wire disposed axially within said shell, a pair of field tubes disposed about opposite ends of said wire and electrically connected to said shell, an inner cylindrical shell co-axial with said outer shell and electrically connected thereto, a polyethylene cylinder disposed concentrically within said inner shell, ethylene filling gas disposed within said polyethylene cylinder, a source of radiation of known intensity mounted to direct a beam of radiation into said counter between confronting ends of said field tubes, absorber means removably disposed to intercept said beam and prevent said radiations from entering said counter between said tubes, and means for establishing a potential between said outer shell and center wire to operate said counter in the proportional region.

5. A fast neutron dosimeter system comprising a counter provided with a conductive outer shell, a collector electrode axially disposed within said shell, a polyethylene cylinder disposed within said shell and concentrically about said center electrode, means for filling said cylinder with ethylene gas substantially free from impurities, means for establishing a potential between said outer shell and said collector wire to operate said counter in proportional region, a linear amplifier having substantially equal differentiating and integrating time constants, the dimensions of said polyethylene cylinder, the magnitude of said potential and the gas pressure within said counter being so related that the ratio of electron collection time in said counter to the amplifier time constant in less than substantially 2.0.

6. A fast neutron tissue-equivalent dosimeter comprising an outer conductive cylindrical shell, a center electrode disposed axially therewithin and electrically insulated therefrom, a polyethylene cylinder disposed within said shell to define a counting volume and conductively connected to said shell, and ethylene gas disposed within said cylinder.

7. A fast neutron counter comprising an outer conductive envelope, an intermediate conductive envelope disposed therewithin and conductively connected thereto, a polyethylene liner carried by the walls of said intermediate envelope to form an inner counting chamber, a center wire electrode disposed within said chamber, means for electrically coupling said center electrode and said outer envelope to be externally energized, a plurality of apertures in said intermediate envelope and polyethylene liner, a pair of field tubes disposed at opposite ends of said counting chamber about said center wire and adapted to be connected to a source of external voltage, a source of substantially impurity-free ethylene gas, and means for flushing said gas continuously through said outer envelope, said apertures, and said counting chamber.

References Cited in the file of this patent

UNITED STATES PATENTS

| | | |
|---|---|---|
| 2,469,460 | Fearon | May 10, 1949 |
| 2,493,935 | Wiegand et al. | Jan. 10, 1950 |
| 2,519,007 | Wilson | Aug. 15, 1950 |
| 2,590,925 | Borowski et al. | Apr. 1, 1952 |
| 2,596,080 | Raper et al. | May 6, 1952 |
| 2,605,435 | Krasnow et al. | July 29, 1952 |
| 2,616,052 | Hurst | Oct. 23, 1952 |